United States Patent
Takeda et al.

(10) Patent No.: US 7,603,519 B2
(45) Date of Patent: Oct. 13, 2009

(54) STORAGE SYSTEM AND METHOD OF CONTROLLING THE SAME

(75) Inventors: Takahiko Takeda, Minamiashigara (JP); Ryusuki Ito, Chigasaki (JP); Keiichi Kaiya, Hadano (JP)

(73) Assignee: Hitachi, Ltd., Tokyo (JP)

(*) Notice: Subject to any disclaimer, the term of this patent is extended or adjusted under 35 U.S.C. 154(b) by 783 days.

(21) Appl. No.: 11/266,059

(22) Filed: Nov. 2, 2005

(65) Prior Publication Data

US 2006/0059303 A1    Mar. 16, 2006

Related U.S. Application Data

(63) Continuation of application No. 10/633,019, filed on Jul. 31, 2003, now Pat. No. 7,003,634.

(30) Foreign Application Priority Data

Mar. 31, 2003    (JP) .............................. 2003-093118

(51) Int. Cl.
*G06F 13/00* (2006.01)
(52) U.S. Cl. ........................ 711/118; 711/148; 709/213; 709/216
(58) Field of Classification Search ................ 711/118, 711/148; 709/213, 216
See application file for complete search history.

(56) References Cited

U.S. PATENT DOCUMENTS

| | | | |
|---|---|---|---|
| 4,675,811 A | 6/1987 | Kishi et al. | |
| 4,920,479 A | 4/1990 | Hashiguchi | |
| 5,146,589 A | 9/1992 | Peet, Jr. et al. | |
| 5,606,686 A | 2/1997 | Tarui et al. | |
| 5,678,026 A | 10/1997 | Vartti et al. | |
| 5,720,028 A | 2/1998 | Matsumoto et al. | |
| 6,038,674 A | 3/2000 | Sasaki et al. | |
| 6,260,109 B1 | 7/2001 | Ofer et al. | |
| 6,349,349 B1 | 2/2002 | Fujita et al. | |
| 6,425,051 B1 | 7/2002 | Burton et al. | |
| 6,446,223 B1 | 9/2002 | Morishita et al. | |
| 6,529,976 B1 | 3/2003 | Fukuzawa et al. | |
| 6,535,932 B1 | 3/2003 | Endoh et al. | |

(Continued)

FOREIGN PATENT DOCUMENTS

EP    0981091 A2    2/2000

(Continued)

OTHER PUBLICATIONS

European Patent Office Search Report dated for EPO patent application EP03015402 (May 8, 2008).

*Primary Examiner*—Reba I Elmore
(74) *Attorney, Agent, or Firm*—Townsend and Townsend and Crew LLP

(57) ABSTRACT

A storage system which manages a plurality of storage control apparatus in an integrated manner is provided. An I/O request issued by a host apparatus to a second storage control apparatus is forwarded to the second storage control apparatus through a first storage control apparatus. The first storage control apparatus has management information for the second storage control apparatus, allowing a pair comprising a logical device controlled by the first storage control apparatus and a logical device controlled by the second storage control apparatus to be created. In addition, the first storage control apparatus is capable of controlling the second storage control apparatus.

1 Claim, 14 Drawing Sheets

U.S. PATENT DOCUMENTS

| | | |
|---|---|---|
| 6,574,709 B1 | 6/2003 | Skazinski et al. |
| 6,681,303 B1 | 1/2004 | Watanabe et al. |
| 6,725,331 B1 | 4/2004 | Kedem |
| 6,757,753 B1 | 6/2004 | Dekoning et al. |
| 6,757,792 B2 | 6/2004 | Morishita et al. |
| 7,003,634 B2 * | 2/2006 | Takeda et al. ............... 711/148 |
| 2002/0133740 A1 | 9/2002 | Oldfield et al. |
| 2003/0097607 A1 | 5/2003 | Bessire |
| 2003/0105931 A1 | 6/2003 | Weber et al. |
| 2003/0131261 A1 | 7/2003 | Hashimoto et al. |
| 2003/0158999 A1 | 8/2003 | Hauck et al. |
| 2003/0221077 A1 | 11/2003 | Ohno et al. |
| 2004/0123026 A1 | 6/2004 | Kaneko |
| 2005/0235107 A1 | 10/2005 | Ohno et al. |

FOREIGN PATENT DOCUMENTS

| | | |
|---|---|---|
| EP | 1357476 A2 | 10/2003 |
| JP | 10-283272 A | 10/1998 |
| JP | 10-333838 | 12/1998 |
| JP | 11-085410 A | 3/1999 |
| JP | 11-305945 A | 11/1999 |
| JP | 1400893 A2 | 3/2004 |

* cited by examiner

FIG.2

| Control-apparatus number (101) | Case location (102) | Initiator control unit number (103) | Node Name (104) | Address (105) |
|---|---|---|---|---|
| 0 | Self | 0 | HTC | 0000E8 |
| 1 | Other | 1 | SBC | 0100E4 |
| 2 | Not applicable | Not applicable | Not applicable | Not applicable |

| Logical-device number (201) | Control-apparatus number (202) | Storage-device number (203) | Pair state (204) | Pair number (205) | Attribute (206) | Pair logical device number (207) | Copy pointer (208) |
|---|---|---|---|---|---|---|---|
| 0 | 0 | 0 | Split | 0 | Primary | 1 | Not applicable |
| 1 | 1 | 0 | Split | 0 | Auxiliary | 0 | Not applicable |
| 2 | 1 | 1 | Simplex | Not applicable | Primary | Not applicable | Not applicable |
| 3 | Not applicable | Not applicable | Simplex | Not applicable | Primary | Not applicable | Not applicable |

```
      0 1 2 3 4 5 6 7 · · ·
      0 0 1 0 1 1 1 0 · · ·
      1 1 1 1 1 1 0 0 · · ·
Pair number 0   ·           ·
                ·           ·
      0 0 0 0 1 0 0 0 · · ·

0 0 0 0 0 0 0 0 · · ·
      0 0 0 0 0 0 0 0 · · ·
Pair number 1   ·           ·
                ·           ·
      0 0 0 0 0 0 0 0 · · ·

·                ·
      ·                ·
      ·                ·

0 0 0 0 0 0 0 0 · · ·
      0 0 0 0 0 0 1 1 · · ·
Pair number N  ·            ·
               ·            ·
      1 1 1 1 0 0 0 0 · · ·
```

FIG.6

| Logical-device number (401) | Access-I/O counter (402) | Read-I/O counter (403) | Write-I/O counter (404) |
|---|---|---|---|
| 0 | 0020 | 0010 | 0010 |
| 1 | 0010 | 0006 | 0004 |
| 2 | 0100 | 0100 | 0000 |
| 3 | 0000 | 0000 | 0000 |
| ... | ... | ... | ... |

FIG.14

| Control-apparatus number /101 | Case location /102 | Initiator control unit number /103 | Node name /104 | Address /105 |
|---|---|---|---|---|
| 0 | Self | 0 | HTC | 0000E8 |
| 1 | Other | 0 | SBC | 0000E4 |
| 2 | Not applicable | Not applicable | Not applicable | Not applicable |
| . | . | . | . | . |
| . | . | . | . | . |
| . | . | . | . | . |

STORAGE SYSTEM AND METHOD OF CONTROLLING THE SAME

CROSS-REFERENCE TO RELATED APPLICATION(S)

This is a continuation of U.S. application Ser. No. 10/633,019, filed Jul. 31, 2003, and entitled "Storage System and Method of Controlling the Same," which application claimed priority from Japan Patent Application No. 2003-093118, filed Mar. 31, 2003.

BACKGROUND OF THE INVENTION

The present invention relates to a method of configuring pairs each consisting of logical devices to be controlled by two or more storage control apparatus, a system for processing I/O instructions issued by the storage control apparatus to the pair of logical devices and a storage system for implementing the I/O-processing system. In the case of a logical-device pair in a control domain extended over those of a plurality of storage control apparatus, an attempt may be made to allow accesses to be made to individual logical devices of the pair. In such a case, a host apparatus needs to issue a command to make a transition to a state known as a split state. This command causes each of the logical devices composing the pair to transit to a state in which the access history of one of the logical devices is managed separately from the management of the access history of the other logical device. A technology concerning such a remote copy is described for example in Japanese Patent Laid-open No. Hei 10-333838.

In this case, I/O instructions issued by the host apparatus to the individual logical devices are received and processed by the respective storage control apparatus of the logical devices. Since the I/O instructions issued by the host apparatus to the individual logical devices are processed by the respective storage control apparatus of the logical devices, differences in data between the logical devices of the pair are caused. These differences in data are caused by changes resulting from execution of the I/O instruction. The resulting changes in data are stored in difference-information storage means, which are provided in the storage control apparatus respectively. In order to restore the logical devices, which have been controlled independently of each other so far, back to the original synchronous condition of the logical-device pair, the host apparatus issues a Resync command. When a Resync command is issued, data of the auxiliary logical device is made identical with data of the primary logical device by copying the data of the primary logical device to the auxiliary logical device. Typically, the primary logical device is the pair's logical device of an operation system. On the other hand, the auxiliary logical device, which is the pair' other logical device, is typically a volume having a data image of the logical device of the operation system at a point of time.

In this case, however, some data may not be updated by I/O instructions for updating data received during the split state. If some data is not updated, for the data not updated, the amount of data to be copied and the length of the copy operation time can be reduced by merely merging the changes in data, which have been stored in difference-information storage means, and copying only the result of the merging operation. Assume for example that the process is carried out in execution of a Resync command to copy changes in data under control executed by the primary logical device. In this case, a transfer command is issued to the auxiliary logical device to transfer the auxiliary logical device's data changes stored in the auxiliary logical device to the primary logical device to be merged with the data changes of the primary logical device in order to determine data to be copied as changes in data.

SUMMARY OF THE INVENTION

In accordance with the prior art described above, an interface for exchanging changes in data between the primary logical device and the auxiliary primary logical device is an indispensable interface between the primary logical device and the auxiliary primary logical device. In the present state of the art, a technology developed originally by each storage manufacturer is adopted as a technique for managing change in data. Thus, the remote-copy primary and auxiliary storage control apparatus, which are capable of reducing the magnitudes of data changes to be copied in execution of a Resync command and the length of a copy operation time of the command, are each required to be a storage product made by the same manufacturer.

In a hetero environment where storage control apparatus made by different manufacturers exist, however, the freedom to design a storage control apparatus is obstructed substantially.

It is thus a first object of the present invention to provide a capability of executing a Resync command at a high speed even if there is a difference in management of data changes between the primary and auxiliary control apparatus in a remote copy operation. In addition, it is also another object of the present invention to provide a capability of executing a Resync command at a high speed even if changes in data are to be exchanged between logical devices controlled by storage control apparatus having no function to manage changes in data in the auxiliary control apparatus.

Moreover, in accordance with the prior art, updated information in the primary logical device and updated information in the auxiliary logical device are managed through management of changes in data in their respective control apparatus. Thus, a read instruction issued by the host apparatus in a pair-split state is executed by carrying out no operations except an operation to read out data from the logical device specified in the read instruction. This is because, in a case where data to be read out by the read instruction is updated data, it is necessary to read out the updated data.

It is thus a second object of the present invention to provide a storage control apparatus capable of carrying out distributed processing in execution of a read instruction issued by a host apparatus so as to read out data from the primary and auxiliary logical devices.

A storage control apparatus provided by the present invention to achieve the first object described above can be implemented by connecting an auxiliary logical device to a primary logical device to build a remote copy system comprising: a means for allowing the primary logical device to receive an I/O instruction issued by a host apparatus to the auxiliary logical device; a means for allowing an I/O instruction issued by a host apparatus to the auxiliary logical to be executed from the primary logical device; a means for handling updated I/O locations of data of each logical device, which composes a pair of logical devices, in a pair-split state as difference information and for recording the difference information; a means for carrying out a difference copy operation to copy recorded difference information in a pair Resync process; and a means for determining a logical device, from which data is to be read out in execution of a read instruction issued by the host apparatus, on the basis of statistical information on I/O operations carried out on the logical devices and the difference information of the pair of logical devices.

To put it concretely, there is provided a configuration in which difference information on the primary side and the difference information on the auxiliary side for a pair of logical devices controlled by storage control apparatus are stored in the primary storage control apparatus. By utilizing these pieces of difference information, it is possible to grasp matching portions of data of the primary and auxiliary logical devices. It is thus possible to form a judgment as to whether or not a read instruction issued by the host apparatus to the auxiliary logical device can be executed by reading out data from the primary logical device. By the same token, it is also possible to form a judgment as to whether or not a read instruction issued by the host apparatus to the primary logical device can be executed by reading out data from the auxiliary logical device.

Other features and other objects of the present invention will become apparent from a study of this specification with reference to appended drawings.

BRIEF DESCRIPTION OF THE DRAWINGS

In order to completely understand the present invention and its merits, it is necessary to study the following description by referring to appended drawings described briefly as follows:

FIG. 2 is a diagram showing information on storage control apparatus each implemented by an embodiment of the present invention;

FIG. 3 is a diagram showing device control information used in a storage control apparatus explained as an embodiment of the present invention;

FIG. 5 is a diagram showing difference information used in the storage control apparatus explained as the embodiment of the present invention;

FIG. 6 is a diagram showing statistical information used in the storage control apparatus explained as the embodiment of the present invention;

FIG. 14 is a diagram showing an embodiment of information on the storage control apparatus included in the configuration shown in FIG. 13.

DETAILED DESCRIPTION OF PREFERRED EMBODIMENTS OF THE INVENTION

Figure 1:
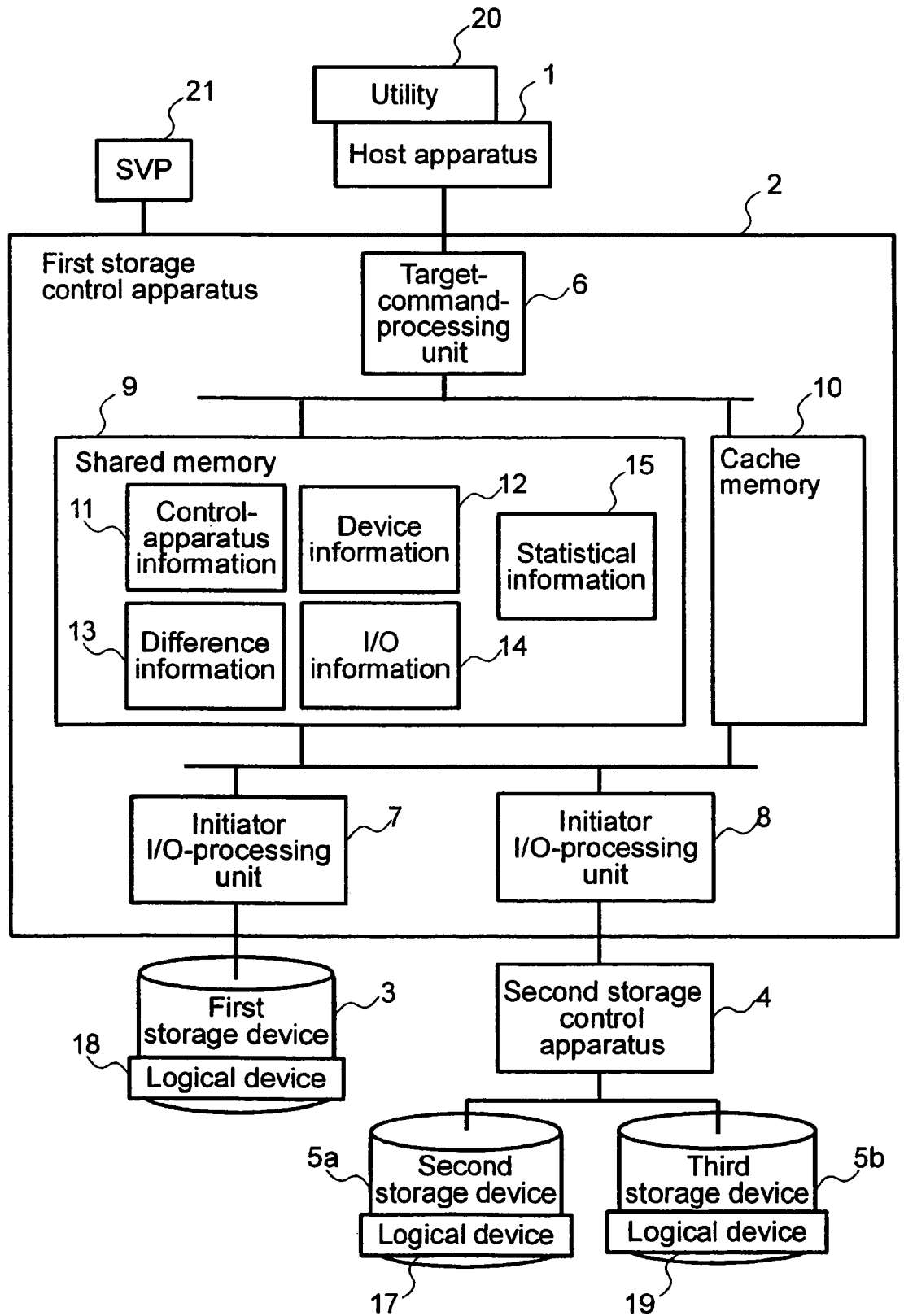
FIG. 1 is a block diagram showing the configuration of a system according to the present invention.

At least, the following matters will become apparent from a study of this specification with reference to the accompanying diagrams. FIG. 1 is a block diagram showing the configuration of a system implemented by an embodiment. A first storage control apparatus 2 is connected to an information-processing apparatus used as a host apparatus 1 for issuing instructions to the first storage control apparatus 2. The host computer 1 is also referred to hereafter simply as a host computer. In accordance with a data output or input request received from the host computer, the first storage control apparatus 2 controls a first storage device 3 in order to write data into the first storage device 3 or read out data from the first storage device 3 respectively. The first storage control apparatus 2 is also connected to a second storage control apparatus 4 through an initiator i/o-processing unit 8.

The first storage control apparatus 2 includes a cache memory 10 for temporarily storing data, which is to be written into the first storage device 3 or has been data read out from the first storage device 3 in accordance with respectively a write or read instruction received from the host apparatus 1.

This cache memory 10 is also used for temporarily storing data to be written into a second storage device 5a or a third storage device 5b by way of the initiator I/O-processing unit 8. The second storage device 5a and the third storage device 5b are connected to the second storage control apparatus 4. In addition, the cache memory 10 is also used for temporarily storing data read out from the second storage device 5a or the third storage device 5b by way of the initiator I/O-processing unit 8.

The first storage control apparatus 2 also includes a target-command-processing unit 6 and an initiator I/O-processing unit 7 in addition to the initiator I/O-processing unit 8. The target-command-processing unit 6 is a component for processing I/O commands received from the host apparatus 1. The initiator I/O-processing unit 7 is a component for processing I/O instructions issued to the first storage device 3. By the same token, the initiator I/O-processing unit 8 is a component for processing I/O instructions issued to the second storage device 5a or the third storage device 5b, which is controlled by the second storage control apparatus 4.

In addition, the first storage control apparatus 2 also includes a shared memory 9 placed between the target-command-processing unit 6 and the initiator I/O-processing unit 7 as well as the initiator I/O-processing unit 8. The shared memory 9 allows information stored therein to be shared and exchanged. The shared memory 9 is also used for storing control-apparatus information 11 for managing addresses provided to the second storage control apparatus 4 connected to the initiator I/O-processing unit 8. By using this control-apparatus information 11, the first storage control apparatus 2 is capable of identifying an address used for the second storage control apparatus 4. By referencing this information, the first storage control apparatus 2 is capable of determining which address in the first storage device 3 is accessed by an instruction issued by the host apparatus 1 to a logical volume. The shared memory 9 is also used for storing device information 12 associating each logical device with a storage device, a storage control device and a pair of logical devices.

On the other hand, the device information 12 is management information indicating which logical volumes form a pair of logical devices. By referencing this information, the first storage control apparatus 2 is capable of forming a judgment as to whether or not a logical volume specified in an I/O write request made by the host apparatus 1 forms a pair of logical devices with another logical volume. If a logical volume specified in an I/O write request issued by the host apparatus 1 forms a pair of logical devices with another logical volume, data written into the logical volume specified in an I/O write request is also written into the other logical volume as well.

To put it in detail, these pieces of information indicate whether logical devices each serving as a target of a write request made by the host apparatus 1 are devices existing in the same case as the first storage control apparatus 2 or devices controlled by a storage control apparatus accommodated in another case outside the first storage control apparatus 2 as is the case with the second storage control apparatus 4.

In addition, the shared memory 9 is also used for storing difference information 13 indicating the location of a difference in data between logical devices forming a pair in case such a difference exists as a result of updating data stored in the logical devices. A difference in data between logical devices forming a pair is referred to hereafter as a difference in data between pair logical devices.

Furthermore, the shared memory 9 is also used for storing I/O information 14 and statistical information 15. The I/O information 14 is information used for communicating a request for a process to be carried out on a logical device from the target-command-processing unit 6 to the initiator I/O-processing unit 7 or 8 and for communicating a result of such a process from the initiator I/O-processing unit 7 or 8 to the target-command-processing unit 6. On the other hand, the statistical information 15 is information indicating the number of I/O requests processed on each logical device. The statistical information 15 is used for the purposes of optimizing an assignment of logical devices to physical volumes (also referred to as storage devices) and optimizing operations to output I/O instructions or balancing I/O operations.

The second storage control apparatus 4 has a means for processing I/O instructions issued by the initiator I/O-processing unit 8 employed in the first storage control apparatus 2 to a logical device 17 assigned to the second storage device 5a and a logical device 19 assigned to the third storage device 5b. The second storage control apparatus 4 has the same specific configuration as the first storage control apparatus 2.

FIG. 2 is a diagram showing the control-apparatus information 11 used by the storage control apparatus to manage assignment of logical devices to storage devices. The control-apparatus information 11 is information for identifying and managing a storage control apparatus connected to an initiator I/O-processing unit. As shown in FIG. 2, the control-apparatus information 11 has the format of a table.

A storage-control-apparatus number 101 is an identifier for identifying a storage control apparatus connected to the initiator I/O-processing unit 8 in the first storage control apparatus. A case location 102 is data indicating whether the storage control apparatus identified by the storage-control-apparatus number 101 exists in the same case as the first storage control apparatus 2 or in another case connected to the first storage control apparatus 2 by the initiator I/O-processing unit 8 employed in the first storage control apparatus 2.

For each storage control apparatus, the table also includes an initiator control unit number 103 indicating an initiator I/O-processing unit in a case where the storage control apparatus is connected to the first storage control apparatus 2 by the initiator I/O-processing unit. For each storage control apparatus, the table further has a node name 104 for uniquely identifying the storage control apparatus and a storage control apparatus address 105 to be used in issuance of an I/O request made by the initiator I/O-processing unit associated with the storage control apparatus.

As described earlier, the control-apparatus information 11 is stored in the shared memory 9 and referred to find the address of a storage control apparatus controlling a logical device used as a target of a requested I/O operation or to establish a connection with the storage control apparatus.

Next, the device information 12 is explained by referring to FIG. 3. The device information 12 is a matrix with each row thereof corresponding to a logical-device number 201 used by the host apparatus to recognize a logical device as an I/O unit. That is to say, each row shows the following information on the logical device. A storage-control-apparatus number 202 is the number of a storage control apparatus controlling a storage device implementing the logical device. The storage-control-apparatus number 202 is the same as the storage-control-apparatus number 101 managed by the control apparatus information table shown in FIG. 2. In the control apparatus information table shown in FIG. 2, the storage-control-apparatus number 101 is the row number. A storage-device number 203 is the number assigned to a storage device controlled by the storage control apparatus identified by the storage-control-apparatus number 202.

A pair state 204 is information indicating whether or not the logical device is a remote-copy pair device. A pair state described as 'Split' indicates that another logical device forms a pair of logical devices in conjunction with this logical device. This 'Split' pair state also indicates that this pair of logical devices is at the present time receiving a request for a write or read operation independently of each other, and a difference obtained as a result of the write operation is managed by executing management of differences. On the other hand, a pair state described as 'Simplex' indicates that there is no other logical device, which forms a pair of logical devices in conjunction with this logical device.

A pair number 205 is an identifier for identifying the logical-device pair of this logical device. An attribute 206 is information indicating whether this logical device is the primary logical device of the logical-device pair or the auxiliary logical device of the logical-device pair. A pair logical device number 207 is the number of a logical device serving as the partner of this logical device in the formation of the logical-device pair. A copy pointer 208 is a pointer pointing to an initial copy progress position in the course of creation of the pair. A copy pointer 208 is a pointer pointing to an initial copy progress position in the course of creation of the pair.

The device information 12 is used to find a target physical (storage) device for implementing a logical device accessed by a request for an I/O access. To put it concretely, the device information 12 is used to find the storage-device number 203 or the storage-control-apparatus number 202 representing information on a physical location to which the request for an I/O access is issued. The request for an I/O access is a request for an operation to read out data from the physical location or a request for an operation to write data into the physical location. In addition, the pair state 204 is used for forming a judgment as to whether or not data in both the primary and auxiliary logical devices forming the pair of logical devices needs to be updated in a double-write operation in execution of a data update I/O instruction. If the outcome of the judgment indicates that such a double-write operation is necessary, the pair logical device number 207 is used for finding out a physical (storage) device implementing a logical device used as the pair partner from the device information 12.

Figure 4:
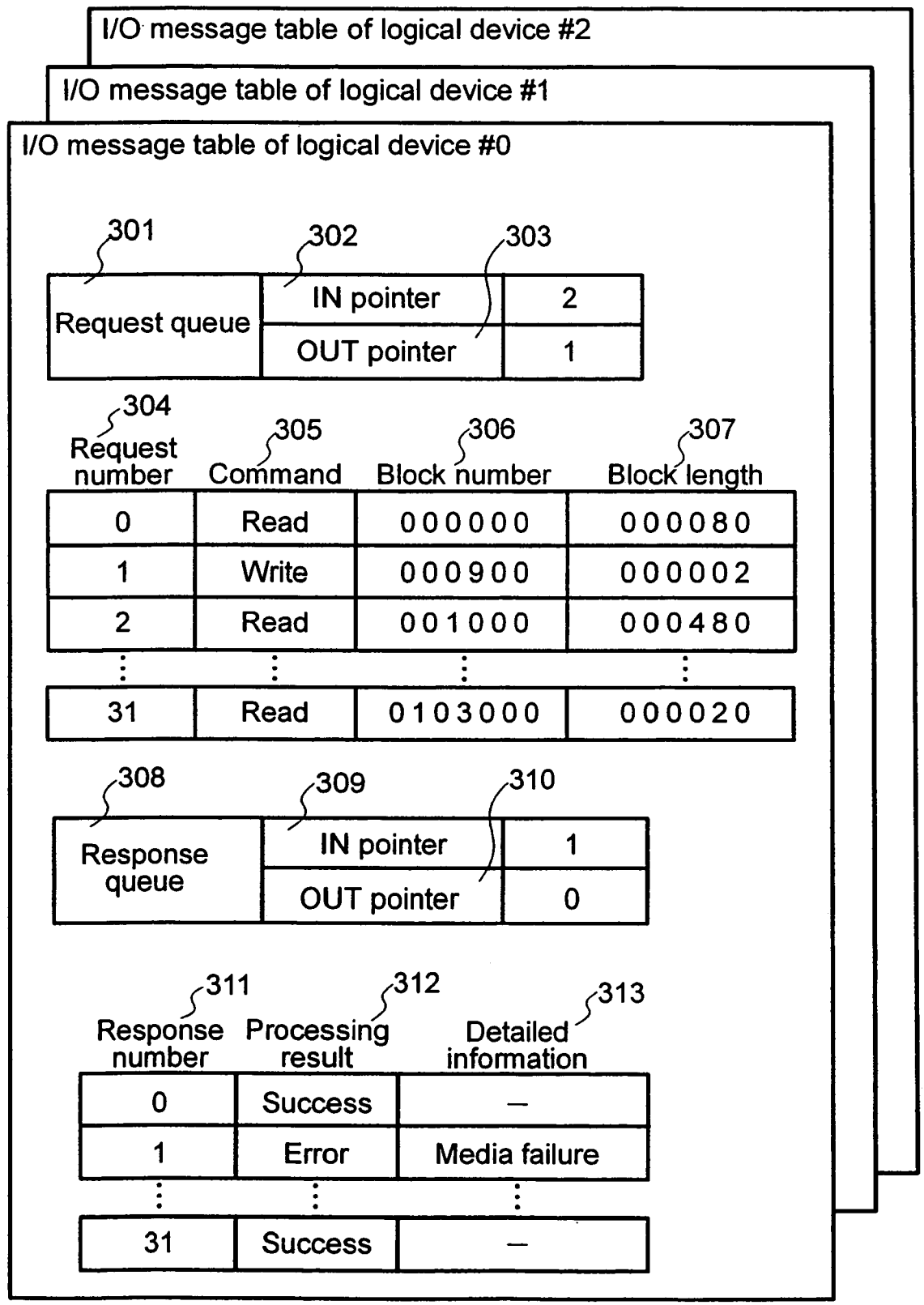
FIG. 4 is a diagram showing message tables each displaying I/O requests and responses to the requests in the storage control apparatus explained as the embodiment of the present invention.

Next, a table for the I/O information 14 is explained by referring to FIG. 4. The target-command-processing unit 6 receives a request for an access to data stored in a logical device from the host apparatus. When the need for a transfer of data between the cache memory 10 and the first storage device 3 or the second storage control apparatus 4 arises, requests for I/O operations, which are to be issued through the initiator I/O-processing unit 7 or 8 respectively, are cataloged on a request queue denoted by reference numerals 301 to 307. A request-queue pointer table 301 includes an IN pointer 302 pointing to a location (or an entry) in the pointer queue. At this location, a newly made request for an access will be cataloged on the request queue. The request-queue pointer table 301 also includes an OUT pointer 303 pointing to a location in the request queue. From this location, an access request already cataloged on the request queue is to be fetched. In order to form a judgment as to whether or not the initiator I/O-processing unit 7 or the initiator I/O-processing unit 8 has passed on all the requests to the first storage device 3 or the second storage control apparatus 4 respectively, the IN pointer 302 and the OUT pointer 303 are examined to find out whether or not there is a difference between them. The main body of the request queue is a table consisting of a plurality of rows each used for storing information on a cataloged request. Each of the rows comprises a request-queue entry number 304, a command 305, a command object block number 306 and a command-processing block length 307. The request-queue entry number 304 is the number of a location at which a request is cataloged on the request queue. The IN pointer 302 or the OUT pointer 303 specifies a value of the request-queue entry number 304. A response queue denoted by reference numerals 308 to 313 is used for keeping results of processing carried out in response to requests cataloged on the request queue. A response-queue pointer table 308 includes an IN pointer 309 pointing to a location in the response queue. At this location, a newly produced processing result will be cataloged on the response queue. The response-queue pointer table 308 also includes an OUT pointer 310 pointing to a location in the response queue. From this location, a processing result already cataloged on the response queue is to be fetched. The main body of the result queue is a table consisting of a plurality of rows each used for storing information on a cataloged result. Each of the rows comprises a result-queue entry number 311, a processing result 312 and detailed information 313. The result-queue entry number 311 is the number of a location at which a processing result is cataloged on the request queue. The IN pointer 309 or the OUT pointer 310 specifies a value of the result-queue entry number 311. The detailed information 313 describes details of the processing result 312, if such details are available.

In other words, the I/O-message table of the I/O information 14 consists of a request queue for cataloging access requests transferred from the target-command-processing unit 6 to a physical device (or a storage device) by way of the initiator I/O-processing unit 7 or 8 and a result queue for cataloging processing results received from the physical device through the initiator I/O-processing unit 7 or 8. A request for an access is cataloged on the request queue if the requested access is determined to be an access requiring that an I/O operation be executed against a physical device (or a storage device), which is allocated to a logical device specified in the request for the access. Processing results cataloged on the result queue are each a response to an access request cataloged on the request queue. Thus, the I/O-message table of the I/O information 14 is a means useful for data transfers with not only the first storage device 3, but also with the second storage control apparatus 4 when such transfers are required.

Next, the difference information 13 is explained by referring to FIG. 5. When the target-command-processing unit 6 receives a request for an operation to update data stored in a logical device from the host apparatus 1, the target-command-processing unit 6 searches the device information 12, which is an information matrix, for a pair state 204 associated with a logical-device number specified in the request. If the pair state 204 associated with a logical-device number specified in the request is the character string 'Split', the requested operation updates only the data in a specific one of the logical devices composing the logical-device pair. Thus, the updated data stored in the specific logical device is different from the other logical device. That is to say, there will be resulted in a difference between the primary and auxiliary logical devices due to the operation to update the data. In this case, a difference bit's position corresponding to the location of a data discrepancy is found from the updated position and length, and this difference bit is set at 1. A difference bit has the following values. A difference bit set at 0 indicates that no data discrepancy exists at a location corresponding to the position of the difference bit. On the other hand, a difference bit set at 1 indicates that a data discrepancy exists at a location corresponding to the position of the difference bit. Thus, when a Resync command is issued to a pair of logical devices, it is necessary to copy only some data from the primary logical device to the auxiliary logical device. The only data needs to be copied is data at locations corresponding to positions of difference bits of the difference information 13 provided for the logical-device pair, which each have a value of 1.

Next, a table of the statistical information 15 is explained by referring to FIG. 6. When the host apparatus 1 issues a request for an access to data stored in a predetermined logical device, at this request, the target-command-processing unit 6 issues a request for an I/O operation to the first storage device 3, the second storage device 5a or the third storage device 5b by way of the initiator I/O-processing unit 7 or 8 by cataloging the request in the table of the I/O information 14. At that time, in the table of the statistical information 15, an access-I/O counter 402 provided for the logical device being accessed is updated. If the requested I/O operation is a read operation, a read-I/O counter 403 is also updated. If the requested I/O operation is a write operation, on the other hand, a write-I/O counter 404 is also updated. Thus, from the table of the statistical information 15, it is possible to grasp the number of times the host apparatus 1 has requested that an I/O operation be carried out on a logical device.

Figure 7:
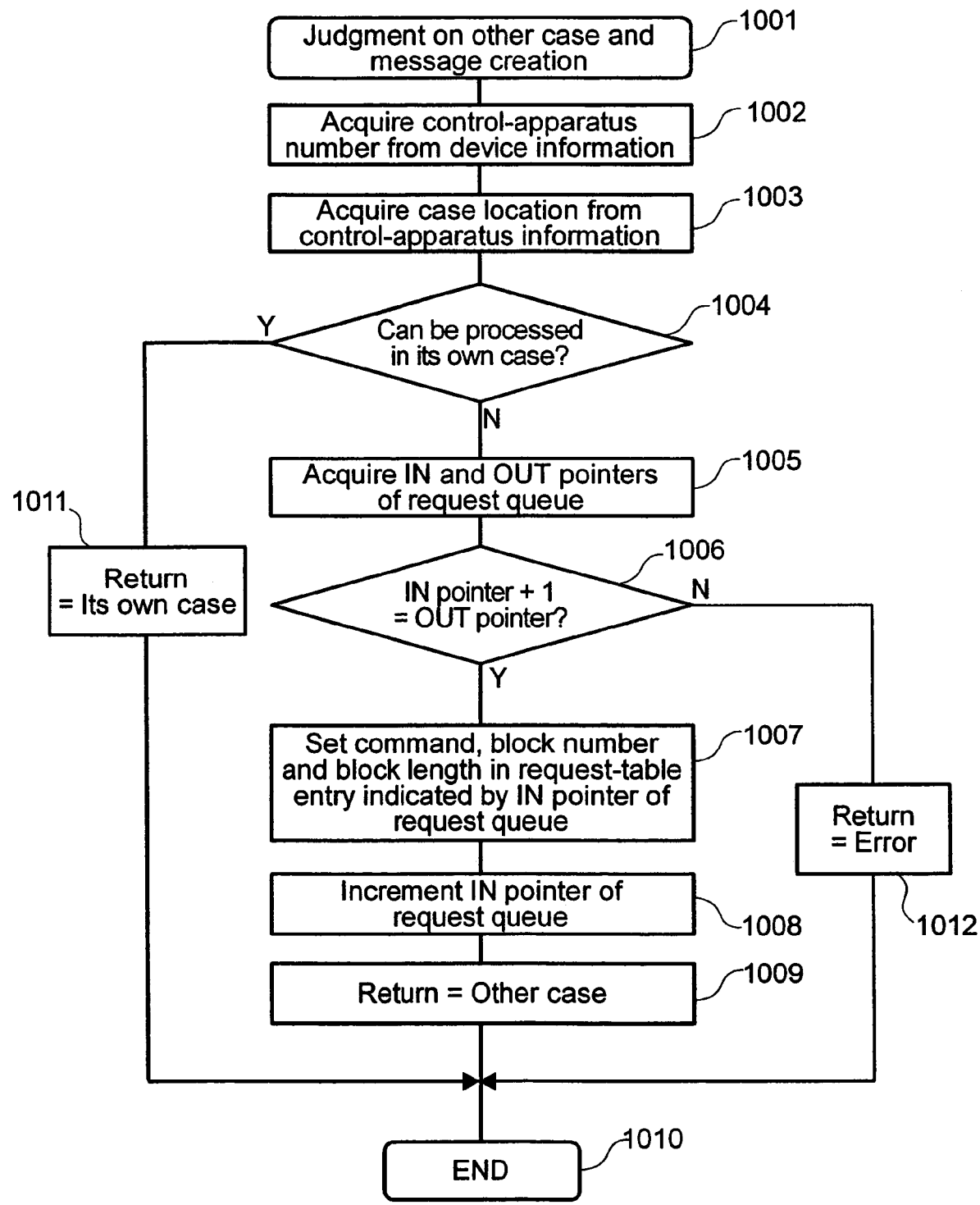
FIG. 7 shows a flowchart representing an I/O request transmission process in the storage control apparatus explained as then embodiment of the present invention.
Figure 8:
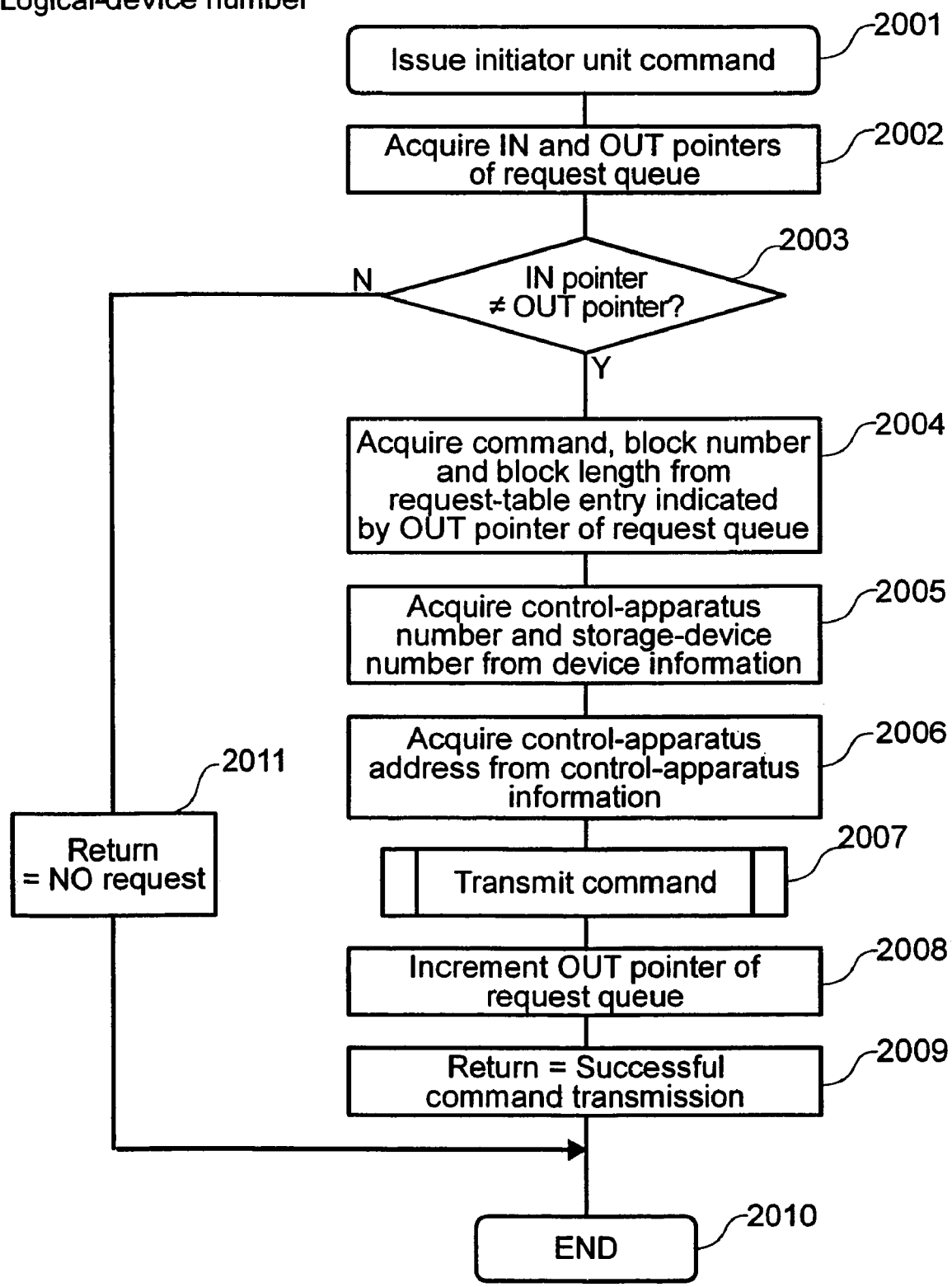
FIG. 8 shows a flowchart representing an I/O request reception process carried out in accordance with the embodiment of the present invention.

By referring to FIGS. 7 and 8, the following description explains details of the present invention's technique of using these pieces of control information. FIGS. 7 and 8 show flowcharts used for explaining a process to transfer an I/O request issued by the host apparatus 1 to the second storage device 5a or 5b, which is controlled by the second storage control apparatus 4, by way of the first storage control apparatus 2 and a process carried out by the first storage control apparatus 2 to pass on the I/O request as an I/O command to the second storage control apparatus 4.

To be more specific, FIG. 7 shows a flowchart representing a process carried out by the target-command-processing unit 6 employed in the first storage control apparatus 2 connected to the host apparatus 1. The target-command-processing unit 6 forms a judgment as to whether a received I/O request can be processed in its own case or must be passed on to the other storage control apparatus 4 by way of the initiator I/O-processing unit 8.

At step 1002, the target-command-processing unit 6 searches the device information 12 for a storage-control-apparatus number 202 associated with a logical-device number 201 specified in the I/O request issued by the host apparatus 1. To put it concretely, the target-command-processing unit 6 reads out a storage-control-apparatus number 202 associated with the specified logical-device number 201 from the table shown in FIG. 3.

Then, at the next step 1003, the target-command-processing unit 6 searches the control-apparatus information 11 shown in FIG. 2 for a case location 102 associated with the storage-control-apparatus number 202 and obtains the case location 102 as information for forming the judgment as to whether or not the logical device identified by the logical-device number 201 is a logical device implemented by a storage device controlled by the first storage control apparatus 2 itself.

Subsequently, the flow of the process goes on to step 1004 to form the judgment as to whether or not the I/O request received from the host apparatus 1 can be processed within the case of the first storage control apparatus 2 itself. If the outcome of the judgment indicates that the I/O request received from the host apparatus 1 is a request that can be processed within the case of the first storage control apparatus 2 itself, execution of an ordinary target I/O operation in its own case is determined to be possible. In this case, the flow of the process goes on to step 1011. The statement saying that execution of an ordinary target I/O operation in the case of the first storage control apparatus 2 itself is possible means that there is a logical device, which serves as a target of an I/O command (the I/O request) received from the host apparatus 1 such as a request for a read or write operation and is controlled by the first storage control apparatus 2 receiving the I/O command.

If the outcome of the judgment indicates that the I/O request received from the host apparatus 1 is a request that cannot be processed within the case of the first storage control apparatus 2 itself or a request that must be processed in another case, that is, if the logical device serving as a target of the I/O request is a logical device implemented by a storage device controlled by another storage control apparatus, on the other hand, the flow of the process goes on to step 1005 at which information is acquired from the I/O message table of the I/O information 14 shown in FIG. 4. Then, at the next step 1006, the acquired information is examined to form a judgment as to whether or not an available slot exists on the request queue of the I/O message table. If no available slot exists on the request queue, the flow of the process goes on to step 1012 at which an error message is returned to urge a retry. If an available slot exists on the request queue, on the other hand, the flow of the process goes on to step 1007 at which the I/O request received from the host apparatus 1 is cataloged on the available slot of the request queue as a command 305, a command object block number 306 and a command-processing block length 307, being given a request-queue entry number 304 specified by the IN pointer 302 included in the request-queue pointer table 301. Then, at the next step 1008, the IN pointer 302 included in the request-queue pointer table 301 is incremented to indicate that the I/O request has been cataloged on the request queue. Subsequently, at the next step 1009, the caller of the routine represented by this flowchart is informed that the I/O request has been cataloged on the request queue.

By the way, in accordance with the flowchart described above by referring to FIG. 7, the target-command-processing unit 6 employed in the first storage control apparatus 2 receiving an I/O command from the host apparatus 1 forms a judgment as to whether or not a logical device serving as an access target of the I/O command is a logical device implemented by a storage device controlled by the first storage control apparatus 2 itself. If the logical device serving as an access target of the I/O command is a logical device implemented by a storage device controlled by the first storage control apparatus 2 itself, the first storage control apparatus 2 itself carries out an I/O process on the logical device implemented by a storage device controlled by the first storage control apparatus 2. Otherwise, the number of a case containing the other storage control apparatus is identified, and the other storage control apparatus is requested to carry out the I/O process. To put it in detail with reference to FIG. 1, if the I/O command received from the host apparatus 1 is a command issued to a logical device 18 formed on the first storage device 3 controlled by the first storage control apparatus 2 itself, the target-command-processing unit 6 and the initiator I/O-processing unit 7 carry out an I/O operation on the logical device 18 on the basis of various kinds of information stored in the shared memory 9. If the I/O command received from the host apparatus 1 is a command issued to a logical device 17 formed on the second storage device 5a or a logical device 19 formed on the third storage device 5b, on the other hand, the target-command-processing unit 6 passes on the I/O command to the second storage control apparatus 4 by way of the initiator I/O-processing unit 8.

Receiving the I/O command passed on by the target-command-processing unit 6, the second storage control apparatus 4 forms a judgment as to whether or not a logical device serving as an access target of the I/O command is a device implemented by a storage device controlled by the second storage control apparatus 4 itself. The judgment is formed in the same way as the procedure represented by the flowchart shown in FIG. 7. If the I/O command received from the target-command-processing unit 6 is a command issued to the logical device 17 formed on the second storage device 5a, for example, the second storage control apparatus 4 itself carries out an I/O process on the logical device 17.

In this case, the first storage control apparatus 2 and the second storage control apparatus 4 do not have to be apparatus of the same type or apparatus having the same performance. This is because the second storage control apparatus 4 merely receives an I/O command passed on by the first storage control apparatus 2 and processes the command in the same way as if the I/O command were issued directly by the host apparatus 1.

On the other hand, the I/O command is passed on by the first storage control apparatus 2 by way of the initiator I/O-processing unit 8 not necessarily as it is. Instead, it is also possible to provide a configuration in which the target-command-processing unit 6 or the initiator I/O-processing unit 8 employed in the first storage control apparatus 2 carries out some conversion work on the I/O command prior to the forwarding of the command to the second storage control apparatus 4.

If the I/O command issued by the host apparatus 1 is a command that cannot be processed by the second storage control apparatus 4 itself, the first storage control apparatus 2 must interpret the command to issue a new equivalent I/O command that can be processed by the second storage control apparatus 4.

The configuration allowing a command to be converted prior to relaying is suitable for a case in which storage control apparatus having performances different from each other are used. For example, the configuration is suitable for a case in which the user utilizing the second storage device 5a and the third storage device 5b, which are controlled by the second storage control apparatus 4, through the second storage control apparatus 4 makes an attempt to newly introduce a storage control apparatus with new functions to serve as the first storage control apparatus 2.

Even if a first storage control apparatus 2 with new and convenient I/O commands is introduced, the I/O commands are invalid for data stored in the second storage device 5a and the third storage device 5b used so far by the user unless the present invention is applied. This is because the second storage control apparatus 4 is a conventional apparatus. In order to apply the new I/O commands to the data stored in the second storage device 5a and the third storage device 5b, it is necessary to transfer the data stored in the second storage device 5a and the third storage device 5b to the first storage device 3 now controlled by the newly introduced first storage control apparatus 2. When the data is transferred, however, the second storage control apparatus 4, the second storage device 5a and the third storage device 5b, which have been used so far, will become wasted apparatus.

In order to solve the problem described above, in accordance with the present invention, the new first storage control apparatus 2 interprets a high-level command received from the host apparatus 1 and carries out a command-equivalence conversion process to convert the high-level command into a command that can be processed by the second storage control apparatus 4. In addition, the first storage control apparatus 2 refers to the control-apparatus information 11 stored in the shared memory 9 employed in the first storage control apparatus 2 in order to enable accesses to logical devices of the second storage control apparatus 4, which is an existing storage control apparatus. In this way, it is possible to effectively utilize data resources used so far and existing hardware resources such as the second storage control apparatus 4, the second storage device 5a and the third storage device 5b.

By the way, in order to make the explanation simple, as an adapter connected to a host apparatus, only one target-command-processing unit 6 is employed in the storage system shown in FIG. 1 as a unit for processing commands received from the host apparatus. For an ordinary storage control apparatus, however, it is generally possible to provide a plurality of adapters each connected to a host apparatus and used to process commands received from the host apparatus.

In addition, in order to improve the entire storage system's extendibility and scalability, the system is devised so as to make it possible to install as many adapters as possible. Such an adapter connected to a host apparatus is also referred to as a director unit or a channel adapter.

In accordance with the present invention, in connecting the second storage control apparatus 4 to the first storage control apparatus 2, such a target-command-processing unit 6 is not used. Instead, the initiator I/O-processing unit 8 is employed to serve as an adapter for connecting storage devices. In the first embodiment, the second storage control apparatus 4 is connected to an adapter port for connecting the first storage control apparatus 2 to storage devices. Thus, for connecting the second storage control apparatus 4, it is not necessary to use a connection unit such as the target-command-processing unit 6, which is a unit for connecting the first storage control apparatus 2 to a host computer. That is to say, there is no inconvenience caused by the fact that the adapter for connection with the host apparatus is occupied in passing on commands to another storage control apparatus.

As described above, at step 1004, an I/O request received from the host apparatus 1 is examined to form a judgment as to whether or not a logical device specified in the request as a target of the request is a logical device controlled by the case of the first storage control apparatus 2 itself. If step 1004 also includes a judgment as to whether or not the processing of the I/O command cannot be carried out in the case of the first storage control apparatus 2 itself but must be carried out in another case, commands issued by the host apparatus can be classified into categories for making a rigid distinction between storage control apparatus capable and incapable of carrying out the processing.

FIG. 8 shows a flowchart representing a procedure executed by the initiator I/O-processing unit 8 to detect an I/O request issued by the host apparatus 1 and cataloged on the request queue at step 1007 of the flowchart shown in FIG. 7 and pass on the request to the second storage control apparatus 4.

To put it concretely by referring to FIG. 1, FIG. 7 shows a flowchart representing a procedure for forming a judgment as to whether an I/O request received from the host apparatus 1 is a command to be processed by the case of the first storage control apparatus 2 itself or a command to be passed on by way of the initiator I/O-processing unit 8 to the second storage control apparatus 4 for processing the command. On the other hand, FIG. 8 shows a flowchart representing a procedure executed by the initiator I/O-processing unit 8 to process an I/O command, which has been issued by the host apparatus 1 and is to be passed on to the second storage control apparatus 4.

When the initiator I/O-processing unit 8 receives a command from the target-command-processing unit 6, it behaves like a host computer and passes on the command to the second storage control apparatus 4.

At step 2002, the initiator I/O-processing unit 8 checks the request queue for cataloging I/O requests passed on to logical devices implemented by storage devices controlled by the second storage control apparatus 4 connected to the initiator I/O-processing unit 8. At the next step 2003, the initiator I/O-processing unit 8 forms a judgment as to whether or not an I/O request for such a logical device has been cataloged on the request queue. To be more specific, the initiator I/O-processing unit 8 forms a judgment as to whether or not an I/O request for such a logical device implemented by a storage device controlled by the second storage control apparatus 4 connected to the initiator I/O-processing unit 8 has been cataloged on the request queue by referring to the request queue of the I/O information 14 shown in FIG. 4.

To put it concretely, the initiator I/O-processing unit 8 compares the IN pointer 302 with the OUT pointer 303 in the I/O message table provided for the logical device as shown in FIG. 4. If the IN pointer 302 is found equal to the OUT pointer 303, the initiator I/O-processing unit 8 determines that there is no I/O request cataloged on the request queue as evidenced by the fact that the IN pointer 302 has not been incremented yet. In this case, the flow of the procedure goes on to step 2011. If the outcome of the judgment formed at step 2003 indicates that the IN pointer 302 is not equal to the OUT pointer 303, on the other hand, an I/O request is determined to have been cataloged on the request queue. In this case, the flow of the procedure goes on to step 2004 at which a command 305, a command object block number 306 and a command-processing block length 307 are acquired from the request's entry corresponding to a request-queue entry number 304 pointed to by the OUT pointer 303.

Then, at the next step 2005, the initiator I/O-processing unit 8 searches the device information 12 for a storage control number 202 and a storage-device number 203, which are associated with a logical-device number 201 assigned to a logical device serving as a target of the I/O request. Subsequently, at the next step 2006, the initiator I/O-processing unit 8 searches the control-apparatus information 11 for the storage control apparatus's address. Then, at the next step 2007, the initiator I/O-processing unit 8 issues an I/O command to the second storage control apparatus 4. Subsequently, at the next step 2008, the OUT pointer 303 is incremented to indicate that the I/O command has been removed from the request queue. Then, at the next step 2009, a return value is set, indicating that the I/O command has been read out from the request queue and transmitted to the other storage control apparatus 4.

Receiving the I/O command, the second storage control apparatus 4 carries out processing for the I/O command in the same way as a command received from a host apparatus.

Before issuing the I/O command to a target storage control apparatus at step 2007, the initiator I/O-processing unit 8 may interpret the command to recognize processing for the command, and convert the command into a command, the processing of which can be processed by the performance of the target storage control apparatus. In this way, it is possible to connect the first storage control apparatus 2 to a storage control apparatus to serve as a second storage control apparatus having a performance and a function, which are different from those of the first storage control apparatus 2.

The next description explains a difference-setting process for limiting data to be copied at a pair-resync time to only differences in data between the primary logical device and an auxiliary primary device, which form a pair of logical devices. A pair of logical devices comprises at least 2 logical devices. For the sake of convenience, in the description of this specification, one of the logical devices of a logical-device pair is a primary logical device and the other logical device is an auxiliary logical device. Between the logical devices of a logical-device pair, there are states described as follows:

A first state is a duplex state in which data stored in the auxiliary logical device is updated synchronously with the primary logical device to create the same data image as the primary logical device.

A second state is the aforementioned split state in which the duplex state described above does not prevail so that accesses to the logical devices can be made to write data into the devices individually and read out data from the devices also individually. In the split state, areas with the data thereof updated are managed by using the difference information shown in FIG. 5. The difference information indicates which areas has data thereof updated.

When a transition is made from the split state, which is the second state, to the original duplex state, by referencing the difference information, data is restored so that the primary logical volume (device) and the auxiliary logical volume have the same data image. This process to restore data is referred to as a resync process. As explained earlier by referring to FIG. 1 showing the configuration of the present invention, FIG. 7 and FIG. 8, the target-command-processing unit 6 employed in the first storage control apparatus 2 receives I/O commands issued by the host apparatus 1 to the logical devices implemented on the second storage device 5a and the third storage device 5b, which are controlled by the second storage control apparatus 4.

Figure 9:
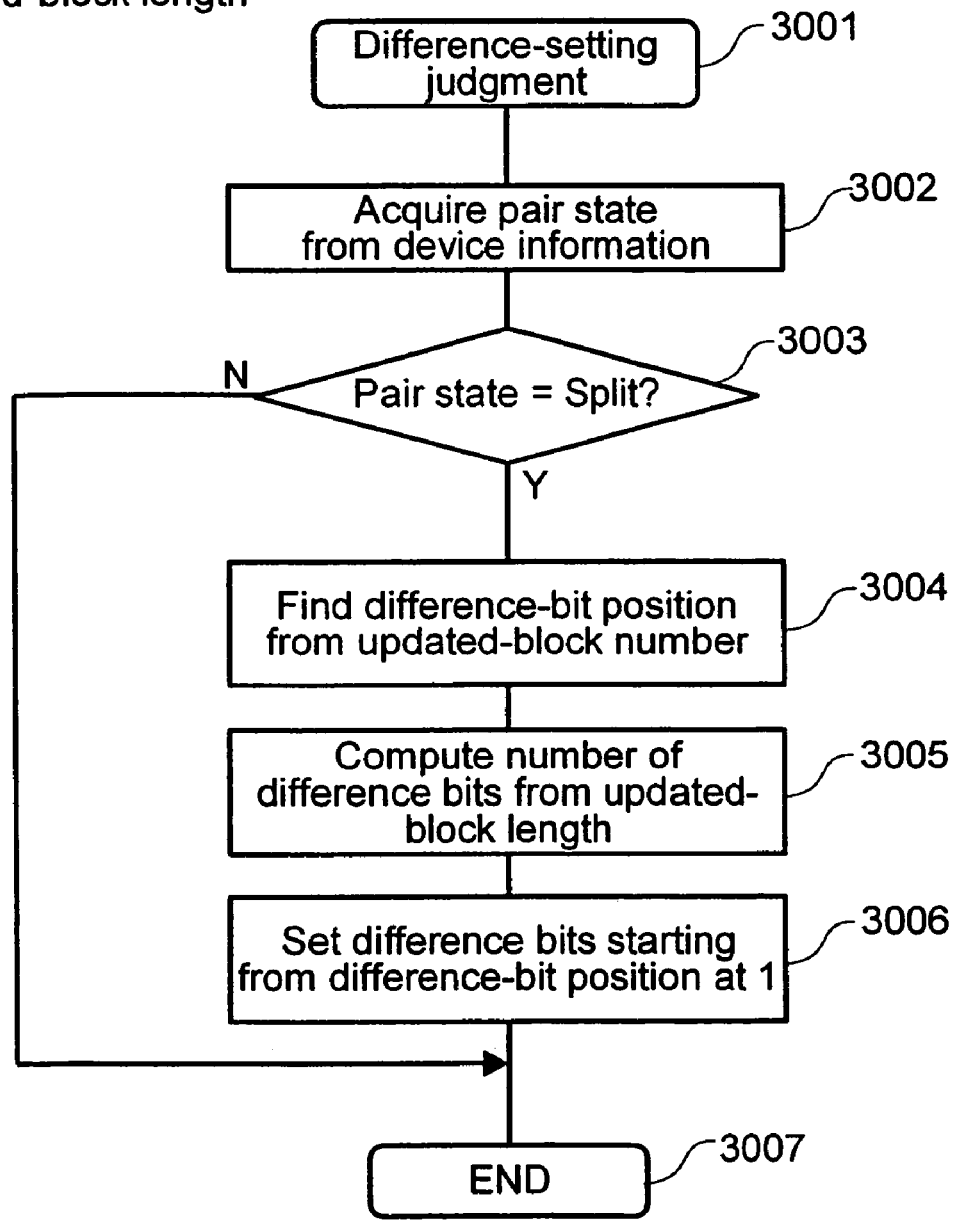
FIG. 9 shows a flowchart representing a process to form a judgment on difference bits and set the difference bits in accordance with the embodiment of the present invention.

FIG. 9 shows a flowchart representing a process to set difference bits of the difference information 13 when the target-command-processing unit 6 receives an I/O command for updating data. There is neither a need to execute steps 3001 to 3007 separately for the primary and auxiliary logical devices nor a need to provide separate pieces of difference information shown in FIG. 5 for the primary and auxiliary logical devices. Thus, the management of the difference information is management executed for both the primary and auxiliary logical devices.

By the way, traditionally, for logical devices forming a pair controlled by physically different storage control apparatus, each of the storage control apparatus manages their own difference information. In the case of primary and auxiliary logical devices provided by the present invention, however, as indicated by the flowchart shown in FIG. 8, the first storage control apparatus 2 receives and interprets I/O requests issued by the host apparatus 1 to the logical devices implemented on the second storage device 5a and the third storage device 5b, which are controlled by the second storage control apparatus 4, as well as carries out processing to pass on the requests. Thus, it is not necessary to manage difference information indicating data discrepancies between the primary and auxiliary logical devices by using the second storage control apparatus 4. That is to say, it is not necessary to provide difference information for each of the storage control apparatus 2 and 4, and only the first storage control apparatus 2 can be used for controlling the data discrepancies. To put it in detail, since the second storage control apparatus 4 does not receive an I/O request directly from the host apparatus 1, but receives a request from the host apparatus 1 through the first storage control apparatus 2, the first storage control apparatus 2 is capable of executing integrated management of updating states for both the logical devices forming a pair. In addition, it is also possible to adopt a method of managing data discrepancies separately for the logical devices. In this case, however, when data stored in the auxiliary logical device is restored to create the same data image as the primary logical device at the end of a split state, data discrepancies stored in the primary logical device need to be merged with data discrepancies stored in the auxiliary logical device. For this reason, there is provided a configuration in which data discrepancies are managed not for each individual logical device but for each pair of logical devices from the beginning. In this way, the procedure for merging data discrepancies is not required.

The following description explains more merits of the integrated management of difference information stored in the first storage control apparatus 2.

Reference numeral 3001 shown in FIG. 9 denotes the procedure of a difference-setting judgment described in the following. First of all, at step 3002, a pair state is acquired from the device information 12 shown in FIG. 3. If the pair state is not a split state, that is, if the pair state is a duplex state, the flow of the procedure goes on to step 3007 at which the execution of the procedure is ended. This is because it is not necessary to acquire the difference information. If the pair state is a split state, on the other hand, the flow of the procedure goes on to step 3004 at which a difference-bit position is found from an updated-block number. Then, at the next step 3005, a difference-bit count is found from an updated-block length.

Subsequently, at the next step 3006, some bits in the difference-management table shown in FIG. 5 are set at 1. The bits set at 1 are selected on the basis of information found at the steps 3004 and 3005.

Figure 10:
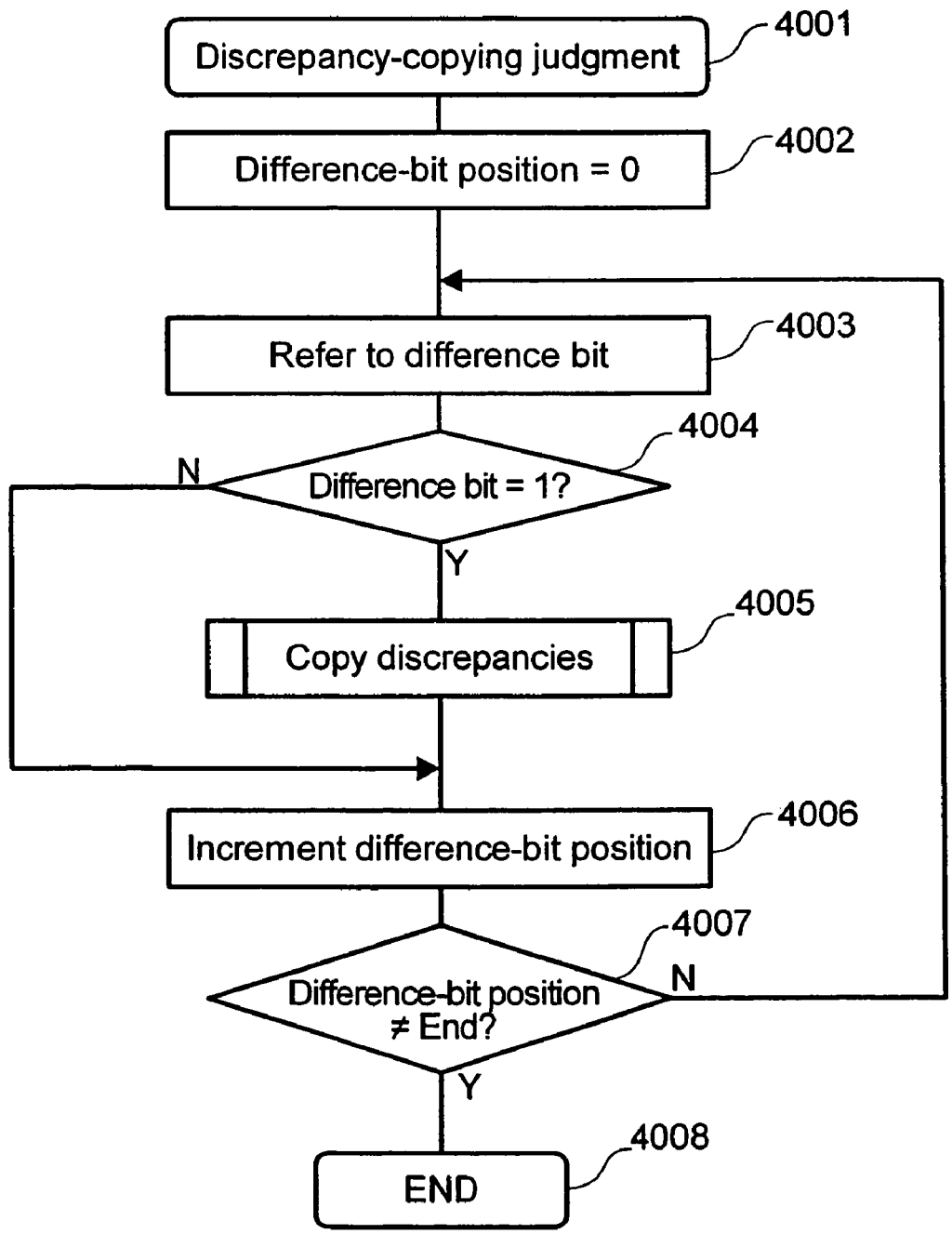
FIG. 10 shows a flowchart representing a process to copy difference information in accordance with the embodiment of the present invention.

FIG. 10 shows a flowchart representing a pair-resync process. As described earlier, information on discrepancies in data between the primary and auxiliary logical devices is managed in an integrated manner by using the difference information 13 stored in the first storage control apparatus 2. Processing to read in difference information from the second storage control apparatus 4 is not required in the pair-resync process represented by the flowchart shown in FIG. 10.

In the flowchart shown in FIG. 10 to represent the process of a judgment on copying of discrepancies, the difference-bit table is referenced. At step 4002, the difference-bit position is set at 0 and, at the next step 4003, the process to reference difference bits is started at the difference-bit position of 0. If a difference bit is 1, the primary logical device's data corresponding to this difference bit is copied to the auxiliary logical device at step 4005. Then, at the next step 4006, the difference-bit position is incremented. Subsequently, at the next step 4007, a judgment is formed to determine whether to repeat or end the process. If the process is to be repeated, the above steps are executed repeatedly till the last difference-bit position is reached.

Figure 11:
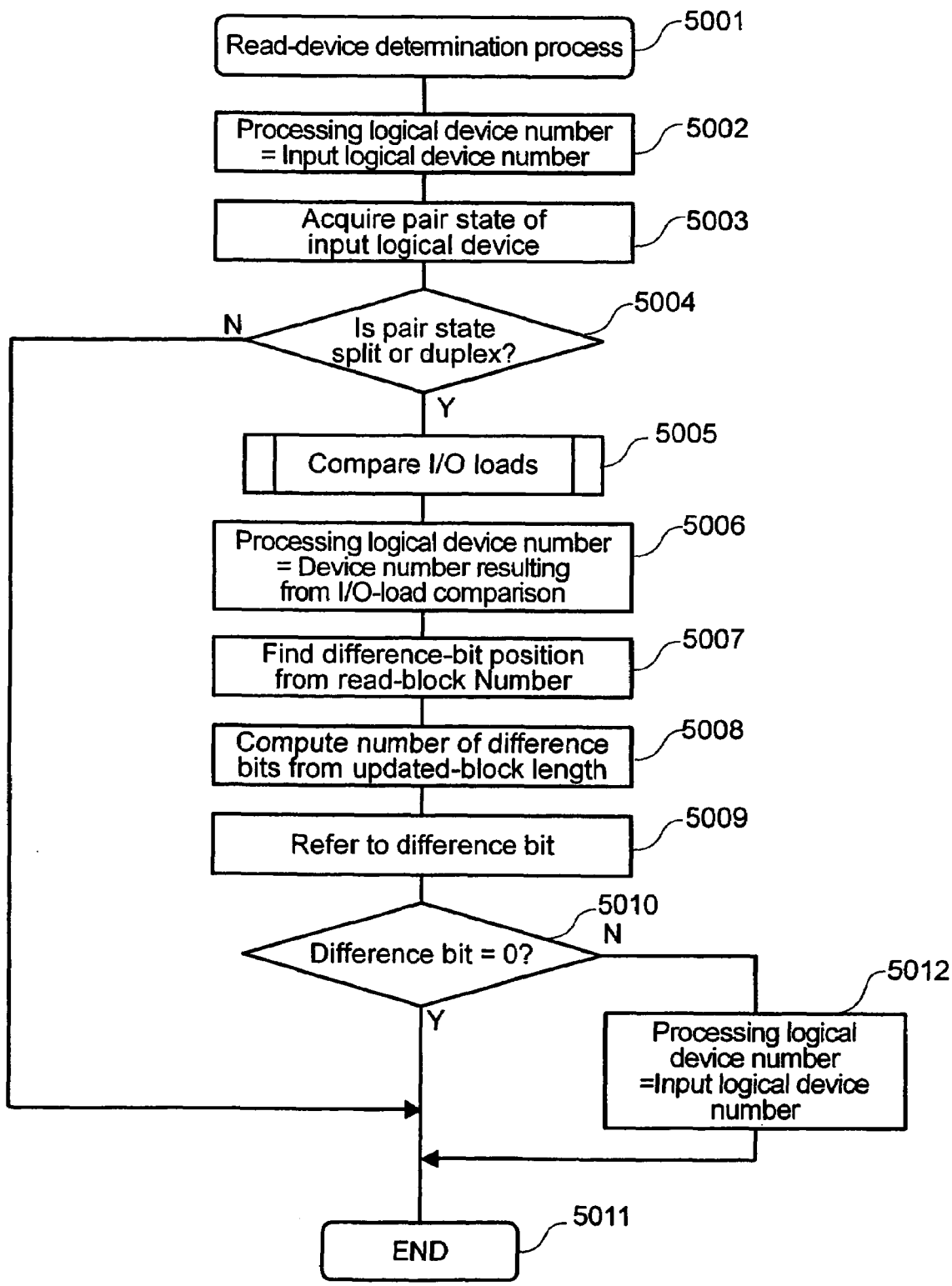
FIG. 11 shows a flowchart representing a process to determine a primary/auxiliary logical device in accordance with the embodiment of the present invention.
Figure 12:
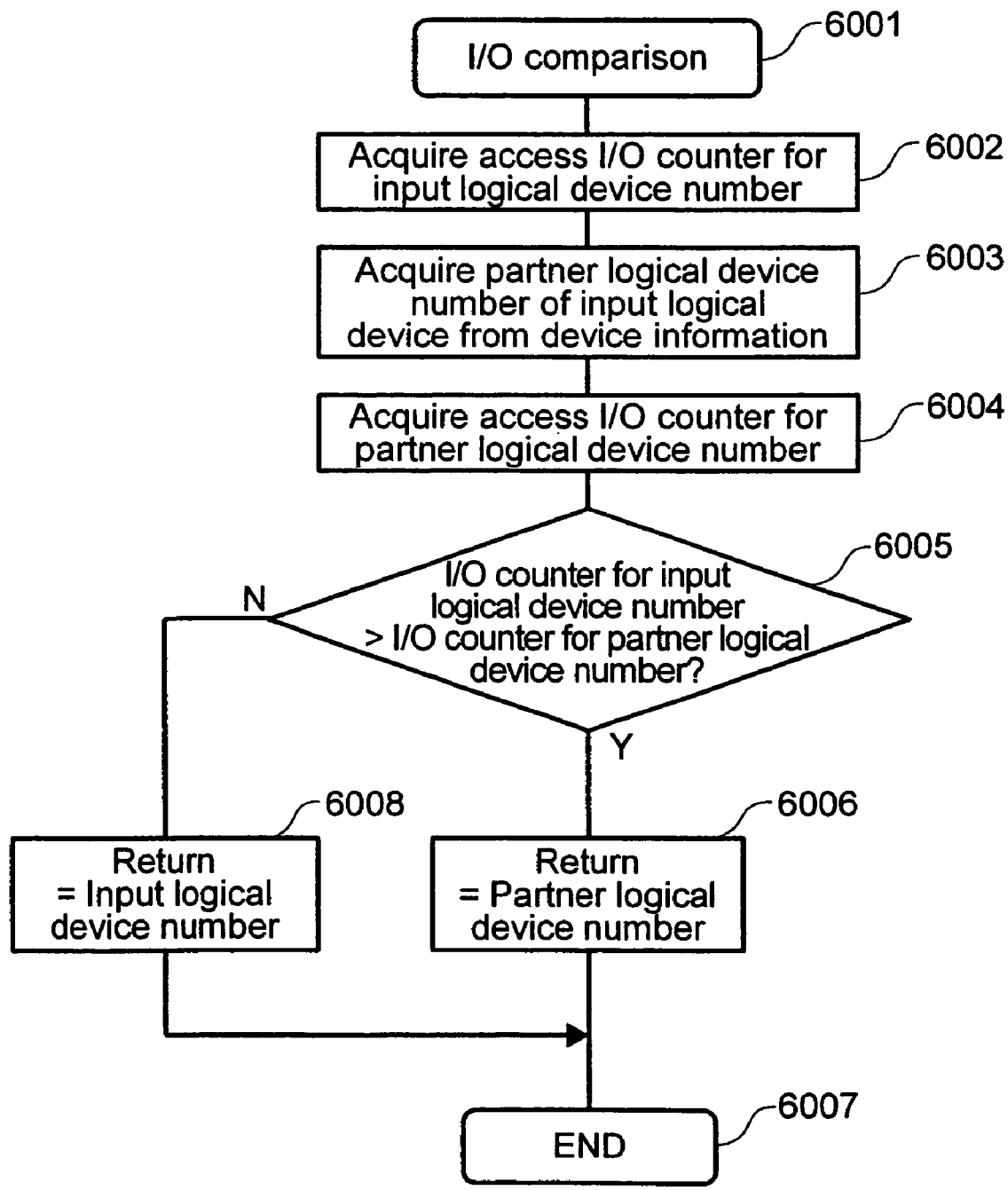
FIG. 12 shows a flowchart representing a process to form a judgment on loads of primary and auxiliary logical devices in accordance with an embodiment of the present invention.

FIGS. 11 and 12 show flowcharts representing processes to determine whether data is to be read out from the primary or auxiliary logical device when a request to read out data from a pair of logical devices is received from the host apparatus 1.

As described earlier, an I/O command issued by the host apparatus 1 to the logical device 17 or 19 implemented on a storage device controlled by the second storage control apparatus 4 accommodated in a case separated from the case of the first storage control apparatus 2 is executed through the first storage control apparatus 2. Thus, the first storage control apparatus 2 is also capable of managing difference information for a logical device implemented on a storage device controlled by the second storage control apparatus 4.

For the above reason, this present invention provides a method of reading out data from a logical device with a better efficiency in executing a read instruction issued by the host apparatus 1. The method is adopted not only for the duplex state of the logical device forming a pair, but also for the split state. To put it in detail, by referencing difference information managed for each pair of logical devices, a difference bit corresponding to the data to be read out can be examined. The data can then be read out from any of the logical devices provided that the difference bit corresponding to the data has not been set at 1. In this case, an I/O load to be borne by the storage devices can be distributed evenly among the storage devices. To put it concretely, an I/O load to be borne by logical devices implemented on physically different storage devices as is the case with the logical devices 17 and 19 shown in FIG. 1 can be distributed evenly among the logical devices so that it is possible to prevent a load borne by a particular storage device from excessively increasing and prevent the performance responding to requests made by the host apparatus 1 from deteriorating.

By referring to the flowchart shown in FIG. 11, the following description explains the method provided by the present invention to determine a device, from which data is to be read out, in detail. At step 5002, an initial state is set right after a read request is received. In the following description, an input logical device is defined as a logical device indicated by a logical-device number in a read request from the host apparatus 1 as a target of the read request. A processing logical device is a logical device from which data is actually read out. In an initial state, the logical-device number of an input logical device is the same as the logical-device number of a processing logical device.

Then, at the next step 5003, the pair formation state of the input logical device is acquired. Subsequently, at the next step 5004, the pair formation state is examined in order to determine whether the state is a split state, a duplex state or another state. The other state is a simplex state in which no pair is formed. If the pair formation state is found to be the simplex state, which is neither the split state nor the duplex state, the process is ended. This is because, in the simplex state, no pair is formed in the first place so that data cannot be read out from another logical device. In this case, the initial value is sustained as it is to indicate that the logical-device number of an input logical device is the same as the logical-device number of a processing logical device. The fact that processing a logical device associated with the logical-device number of a processing logical device means that data is read out from a logical device specified in the read request from the host apparatus 1 as the target of the read request.

If the input logical device is in the split or duplex state, on the other hand, the flow of the process goes on to step 5005 at which the I/O load borne by the input logical device is compared with the I/O load borne by the other logical device in the same pair as the input logical device. The comparison of the I/O loads at step 5005 is described in detail by referring to the flowchart shown in FIG. 12 below.

FIG. 12 shows a flowchart showing an embodiment for forming a judgment as to whether this I/O load from the host apparatus 1 is to be imposed on the logical-device pair's primary logical device or auxiliary logical device. First of all, at step 6002, an I/O counter of the input logical device is acquired. Then, at the next step 6003, the logical-device number assigned to another logical device forming the pair of logical devices in conjunction with the input logical device is acquired. Subsequently, at the next step 6004, an I/O counter of the other logical device indicated by the acquired logical-device number is obtained.

Then, at the next step 6005, the I/O counter of the input logical device is compared with the I/O counter of the other logical device forming the pair of logical devices in conjunction with the input logical device. If the I/O counter of the input logical device is found larger than the I/O counter of the other logical device forming the pair of logical devices in conjunction with the input logical device, the logical-device number assigned to the other logical device is acquired to be used as a return value. If the I/O counter of the input logical device is not larger than the I/O counter of the other logical device forming the pair of logical devices in conjunction with the input logical device, on the other hand, the logical-device number assigned to the input logical device is acquired to be used as a return value. By executing this series of steps, it is possible to obtain the logical-device number assigned to a logical device with a smaller I/O counter.

As the return value is received as a result of the processing represented by the flowchart shown in FIG. 12, the flow of the process represented by the flowchart shown in FIG. 11 goes on to a step 5006 at which the number of the processing logical device is set at a logical-device number, which is the return value of the processing represented by the flowchart shown in FIG. 12.

Then, at the next step 5007, the position of a first difference bit is obtained from the number of the read block. Subsequently, at the next step 5008, the number of difference bits is found from the length of the read block. Then, the difference-bit table for the area is referenced at the next step 5009. Subsequently, at the next step 5010, the difference bits of the table are examined. If all the difference bits are 0, data can be read out from any of the logical devices forming the logical-device pair. In this case, it is appropriate to read out data from the logical device referred to as the aforementioned processing logical device that has a smaller I/O counter and is indicated by the logical-device number acquired at the step 5005. That is to say, the logical-device number acquired at the step 5005 is used as the logical-device number of the processing logical device, which has a smaller I/O counter.

If any of the difference bits examined at the step 5010 are not 0, on the other hand, the logical-device number assigned to the processing logical device is reset to the logical-device number of the input logical device. That is to say, data is to be read out from the input logical device. This is because there are area-data discrepancies between the primary and auxiliary logical devices, from one of which data is to be read out. In consequence, the processing logical device, from which data is to be read out, cannot be changed from the input logical device specified in the I/O request to the other logical device forming the pair of logical devices in conjunction with the input logical device.

It is possible to make appropriate changes to the procedure for determining a logical device, from which data is to be read out, as represented by the flowcharts shown in FIGS. 11 and 12. For example, the pieces of processing to form a judgment on the state of difference bits at steps 5007 to 5010 of the flowchart shown in FIG. 11 may be carried out prior to step 5005 to compare I/O loads. With a procedure implementing such a change, if all the difference bits are 1, data must by all means be read out from the input logical device. It is thus unnecessary to compare I/O loads.

In other words, in accordance with the present invention, the first storage control apparatus 2 manages the difference information of a logical device controlled by another storage control apparatus in an integrated manner. Thus, the first storage control apparatus 2 is capable of examining data's location specified in a read request in order to form a judgment as to whether or not the requested data stored in the primary logical device matches the data at the same location in the auxiliary logical device. As a result, the target-command-processing unit 6 is capable of selecting the primary or auxiliary logical device as a read target.

As described above, this embodiment implements a typical configuration in which the values of I/O counters are used for selecting a processing logical device. Note, however, that if a time-load balance of the entire system displays a special periodical characteristic, it is possible to design a configuration in which a processing logical device is selected in accordance with a predetermined time schedule.

Figure 13:
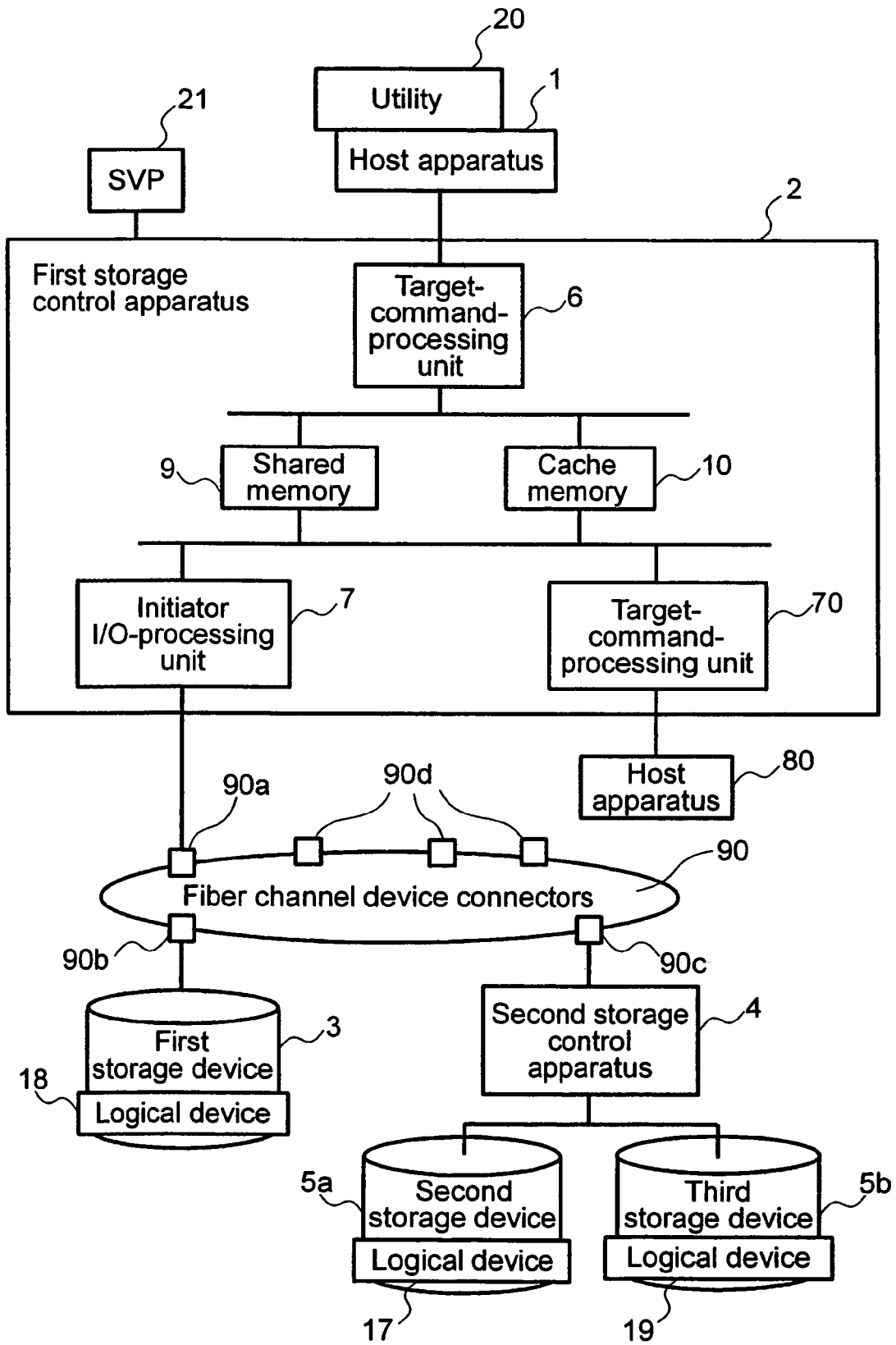
FIG. 13 is a block diagram showing a configuration including a second storage control apparatus connected to a connection outlet of a disc drive in accordance with another embodiment of the present invention.

FIG. 13 is a block diagram showing another embodiment of the present invention. To put it in detail, FIG. 13 shows a second storage control apparatus 4 connected to a port of a fiber channel device connectors 90 used for connecting a disc drive serving as the first storage control apparatus 2. In this case, in the device-information table stored in the shared memory 9 employed in the first storage control apparatus 2, it is necessary to include information, which indicates which node (or port) of the fiber channel device connectors 90 is used for connecting the second storage control apparatus 4.

FIG. 14 is a diagram showing a typical a device-information table that includes a node name 104 indicating a node used for connecting the first storage control apparatus 2 as shown in FIG. 13.

The embodiment shown in FIG. 13 is explained in more detail below. In addition to the target-command-processing unit 6, another target command-processing unit 70 is employed in the configuration of the first storage control apparatus 2. A connector 90a of the fiber channel device connectors 90 is connected to the initiator I/O-processing unit 7. The first storage device 3 is connected to a connector 90b and the second storage control apparatus 4 is connected to another connector 90c. In such a configuration, through the initiator I/O-processing unit 7, the first storage control apparatus 2 is capable of controlling the second storage device 5a and the third storage device 5b, which are under direct control of the second storage control apparatus 4.

In the device-information table shown in FIG. 14, an initiator control unit number 103 is a number identifying an initiator I/O-processing unit. Since the second storage control apparatus 4 is also connected to the initiator I/O-processing unit 7 in the configuration shown in FIG. 13, the initiator-control-unit number 103 for the second storage control apparatus 4 is set at the same value as the initiator-control-unit number 103 for the first storage control apparatus 2 even though the second storage control apparatus 4 is accommodated in a case other than the case for accommodating the first storage control apparatus 2.

Figure 15:
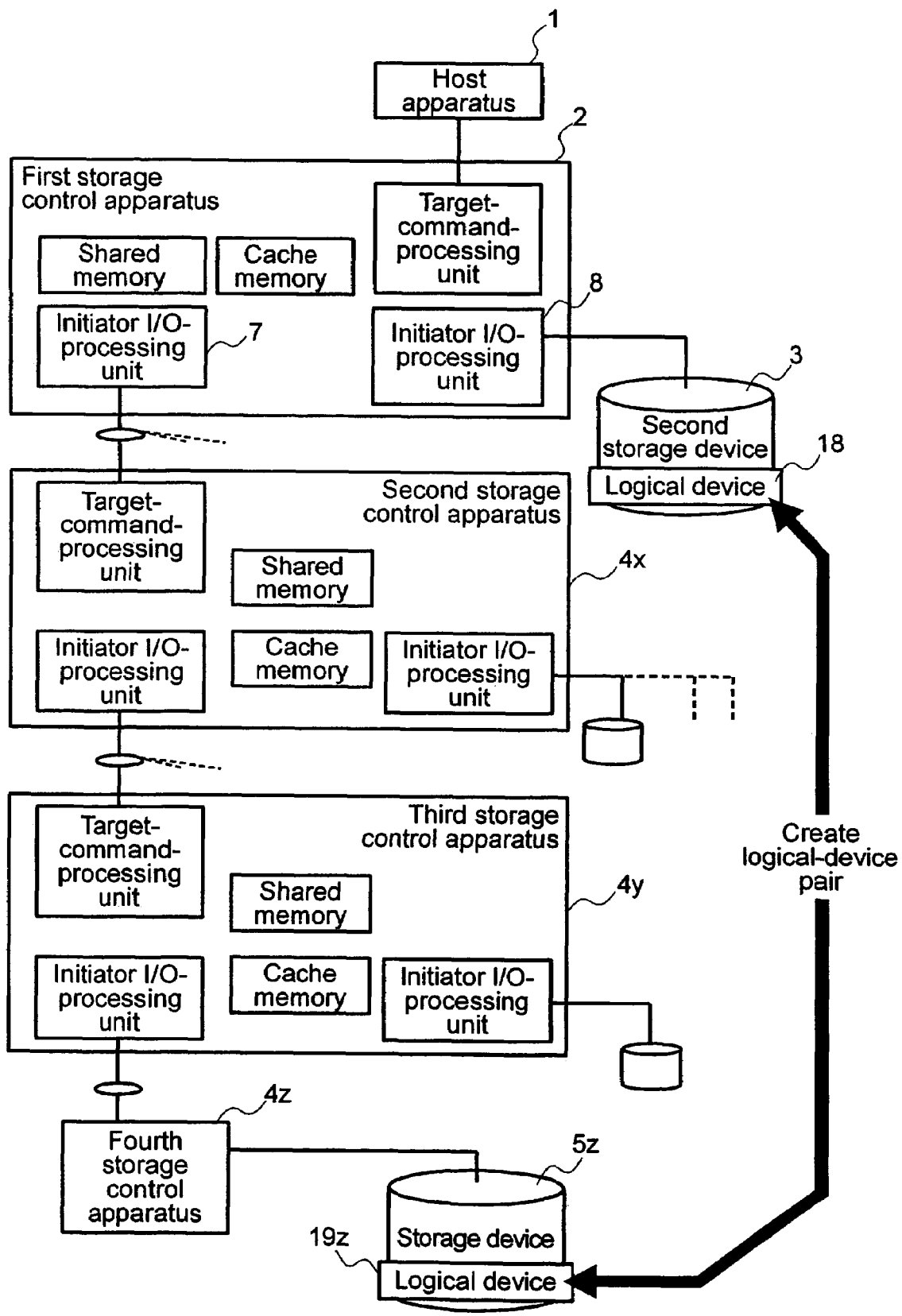
FIG. 15 is a block diagram showing a configuration including a further storage control apparatus connected to a disc connection port in accordance with a further embodiment of the present invention.

FIG. 15 is a block diagram showing another embodiment of the present invention. To put it in detail, FIG. 15 shows a configuration in which a plurality of storage control apparatus are connected to each other through initiator I/O-processing units. In the configuration, a logical device 19z and a logical device 18 form a pair of logical devices. The logical device 19z has its data stored in a second storage device 5z, which is controlled by a fourth storage control apparatus 4z. The fourth storage control apparatus 4z can be accessed by the host apparatus 1 through a plurality of storage control apparatus, namely, the first storage control apparatus 2, a second storage control apparatus 4x and a third storage control apparatus 4y, which each include a control means and device information provided by the present invention. On the other hand, the logical device 18 has its data stored in the first storage device 3, which is directly controlled by the first storage control apparatus 2. When the host apparatus 1 issues a request for an access to the logical device 19z in such a configuration, the logical device 19z is confirmed by using control-apparatus information, device information and I/O information, which are stored in the shared memories of the first storage control apparatus 2, 4z and 4y. Processing for the request for an access can then be carried out on the fourth storage control apparatus 4z accommodated in another case.

The present invention provides a configuration in which the second storage control apparatus 4 is connected to the initiator I/O-processing unit 8 employed in the first storage control apparatus 2 accommodated in a case other than the case accommodating the second storage control apparatus 4 as shown in FIG. 1. In other words, the second storage control apparatus 4 accommodated in the other case is connected to a connection outlet of the first storage control apparatus 2 in an attempt to control the second storage control apparatus 4 from the first storage control apparatus 2.

In the case of a disc-array apparatus like one provided by the present invention, a disc adaptor is connected to a plurality of disc drives through fiber channel device connectors. Thus, the fiber channel device connectors serve as mounting/dismounting means, which are not used up unless all disc drives are connected. By using the mounting/dismounting means of disc drives to connect the second storage control apparatus 4 provided by the present invention, the number of outlets for connection between the first storage control apparatus 2 and the host apparatus 1 is not limited.

In place of a storage device connected to the first storage control apparatus 2, the second storage control apparatus 4 is connected so that a logical device visible on the second storage control apparatus 4 can be controlled as the storage device connected to the first storage control apparatus 2.

The above description has explained details of the present invention wherein only one second storage control apparatus 4 is connected to a disc connection port of the first storage control apparatus 2 as shown in FIG. 1. However, it is possible to design a configuration in which the first storage control apparatus 2 controls storage control apparatus, the number of which is determined in accordance with a policy set by the user from time to time.

In addition, another storage control apparatus can be connected to the disc connection port of the second storage control apparatus as shown in FIG. 15 to execute control hierarchically.

It is to be noted that, in the present invention, a member explained as the target command-processing unit has a function of a channel adapter of a storage control apparatus so that the target command-processing unit is capable of processing a command received from a host apparatus. On the other hand, the initiator I/O-processing unit has the function of a disc adapter of a storage control apparatus so that the initiator I/O-processing unit is capable of controlling an operation to write data, which is destined for a storage device, into the cache memory.

In accordance with the present invention, a logical volume (device) subordinate to the second storage control apparatus can be managed in an integrated manner by the first storage control apparatus. In this case, by utilizing the second storage control apparatus' port for connecting a storage device, the first storage control apparatus' port connected to a host apparatus is no longer used as an interface with a remote-copy pair, and the number of connectable host apparatus does not decrease.

In addition, without regard to differences in data-discrepancy management technique between primary and auxiliary control apparatus for a pair of logical devices accommodated in physically different cases and without regard to whether or not such data discrepancy exists, such a pair can be created and the length of the resync time of the pair can be reduced.

Furthermore, since information on differences in data between the primary and auxiliary logical devices is stored in the primary-side storage control apparatus, a read instruction received from a host apparatus can be executed on a selected one of the primary or auxiliary logical devices so as to make distribution of processing loads among the primary or auxiliary logical devices more balanced.

Preferred embodiments of the present invention have been described in details, but the embodiments should be interpreted as typical implementations of the present invention rather than limitations imposed on the present invention. That is to say, a variety of changes, replacements and modifications can be made to the embodiments without departing from the spirit and scope of the present invention, which are only defined by claims appended as follows.

What is claimed is:

1. A control method adopted by a storage system including a first storage control apparatus having a first storage device and a second storage control apparatus including a second storage device connected to the first storage control apparatus, the control method comprising:

allowing the first storage control apparatus to receive a data write or read command from a host apparatus;

determining whether the data write or read command received from the host apparatus is to be executed by a data operation involving the first storage device or a data operation involving the second storage device based upon management information in the first storage control apparatus; and writing data into the first storage device or the second storage device or reading out data from the first storage device or the second storage device based upon the step of determining.

* * * * *

UNITED STATES PATENT AND TRADEMARK OFFICE
CERTIFICATE OF CORRECTION

PATENT NO. : 7,603,519 B2  Page 1 of 1
APPLICATION NO. : 11/266059
DATED : October 13, 2009
INVENTOR(S) : Ryusuke Ito and Keiichi Kaiya It is certified that error appears in the above-identified patent and that said Letters Patent is hereby corrected as shown below:

Cover Page:

In section (75) as indicated below:

"Ryusuki Ito"

should read,

-- Ryusuke Ito --

Signed and Sealed this

Second Day of November, 2010

David J. Kappos
*Director of the United States Patent and Trademark Office*